(12) United States Patent
Alexander

(10) Patent No.: US 7,445,761 B1
(45) Date of Patent: Nov. 4, 2008

(54) METHOD AND SYSTEM FOR PROVIDING COMPRESSED SUBSTANTIALLY OXYGEN-FREE EXHAUST GAS FOR INDUSTRIAL PURPOSES

(76) Inventor: Wade J. Alexander, 17318 E. 109th St. N., Owasso, OK (US) 74055

( * ) Notice: Subject to any disclaimer, the term of this patent is extended or adjusted under 35 U.S.C. 154(b) by 652 days.

(21) Appl. No.: 10/428,875

(22) Filed: May 2, 2003

(51) Int. Cl.
*B01J 19/14* (2006.01)
*B01D 53/92* (2006.01)

(52) U.S. Cl. ............... 423/212; 423/262; 423/213.2; 423/213.7; 423/351; 60/281; 60/273; 60/282; 60/299; 60/303

(58) Field of Classification Search .................. None
See application file for complete search history.

(56) References Cited

U.S. PATENT DOCUMENTS

| | | | | |
|---|---|---|---|---|
| 1,868,755 A | | 7/1932 | Mount | |
| 1,945,407 A | | 1/1934 | Adair et al. | 62/633 |
| 2,240,550 A | | 5/1941 | Conlon, Jr. | 166/21 |
| 2,825,408 A | | 3/1958 | Watson | 166/11 |
| 2,937,490 A | * | 5/1960 | Calvert | 60/274 |
| 3,004,601 A | | 10/1961 | Bodine | 166/39 |
| 3,100,528 A | | 8/1963 | Plummer et al. | 166/42 |
| 3,301,323 A | | 12/1963 | Parsons | 166/1 |
| 3,137,344 A | | 6/1964 | Wiemer | 166/9 |
| 3,232,885 A | * | 2/1966 | Henke | 252/372 |
| 3,381,523 A | | 5/1968 | Nettles | 73/40.5 |
| 3,389,972 A | * | 6/1968 | Pottharst, Jr. | 422/62 |
| 3,579,308 A | * | 5/1971 | Gower | 422/112 |
| 3,653,438 A | | 4/1972 | Wagner | 166/266 |
| 3,725,012 A | * | 4/1973 | Gower | 422/62 |
| 3,908,762 A | | 9/1975 | Redford | 166/263 |
| 4,136,747 A | | 1/1979 | Mallory et al. | 175/66 |
| 4,324,291 A | | 4/1982 | Wong et al. | 166/252 |
| 4,325,432 A | | 4/1982 | Henry | 166/245 |
| 4,350,505 A | | 9/1982 | Mallory et al. | 55/227 |
| 4,533,374 A | | 8/1985 | Haag | 62/18 |
| 4,546,829 A | | 10/1985 | Martin et al. | 166/267 |
| 4,593,763 A | | 6/1986 | Burke | 166/302 |
| 4,891,939 A | | 1/1990 | Brighenti | 60/278 |
| 4,915,169 A | | 4/1990 | Hwang | 166/252 |
| 5,036,915 A | | 8/1991 | Wyganowski | 166/252 |
| 5,056,315 A | * | 10/1991 | Jenkins | 60/614 |
| 5,063,772 A | | 11/1991 | Wellington et al. | 73/40.7 |
| 5,232,049 A | | 8/1993 | Christensen et al. | 166/252 |
| 5,271,215 A | | 12/1993 | Guillet | 60/37.5 |
| 5,663,121 A | | 9/1997 | Moody | 507/102 |
| 5,988,280 A | | 11/1999 | Crawford et al. | 166/303 |

(Continued)

*Primary Examiner*—Jennifer A Leung
(74) *Attorney, Agent, or Firm*—Gable Gotwals

(57) ABSTRACT

A method and system of providing compressed substantially oxygen-free exhaust gas for industrial purposes including the steps of extracting exhaust gas from a lean burn engine consuming a mixture of natural gas fuel and air, passing the extracted exhaust gas through a cooling step to cause entrained water vapor therein to condense out, separating and disposing of the condensed water, measuring the oxygen content of the exhaust gas, using the measurement to regulate the quantity of natural gas fed into an igniter into which the exhaust gas is also fed so that substantially all of the oxygen in the exhaust gas is consumed by combustion with the natural gas in the igniter to provide at an outlet of the igniter substantially oxygen-free exhaust gas, and compressing the substantially oxygen-free exhaust gas to provide compressed exhaust gas for industrial applications.

2 Claims, 1 Drawing Sheet

U.S. PATENT DOCUMENTS

| | | | |
|---|---|---|---|
| 6,032,747 A | 3/2000 | Moody et al. | 175/71 |
| 6,039,116 A | 3/2000 | Stevenson et al. | 166/263 |
| 6,315,894 B1 | 11/2001 | Wiemers et al. | 210/96.1 |
| 6,893,615 B1 * | 5/2005 | Alexander | 422/177 |
| 2006/0218905 A1 * | 10/2006 | Alexander | 60/301 |

* cited by examiner

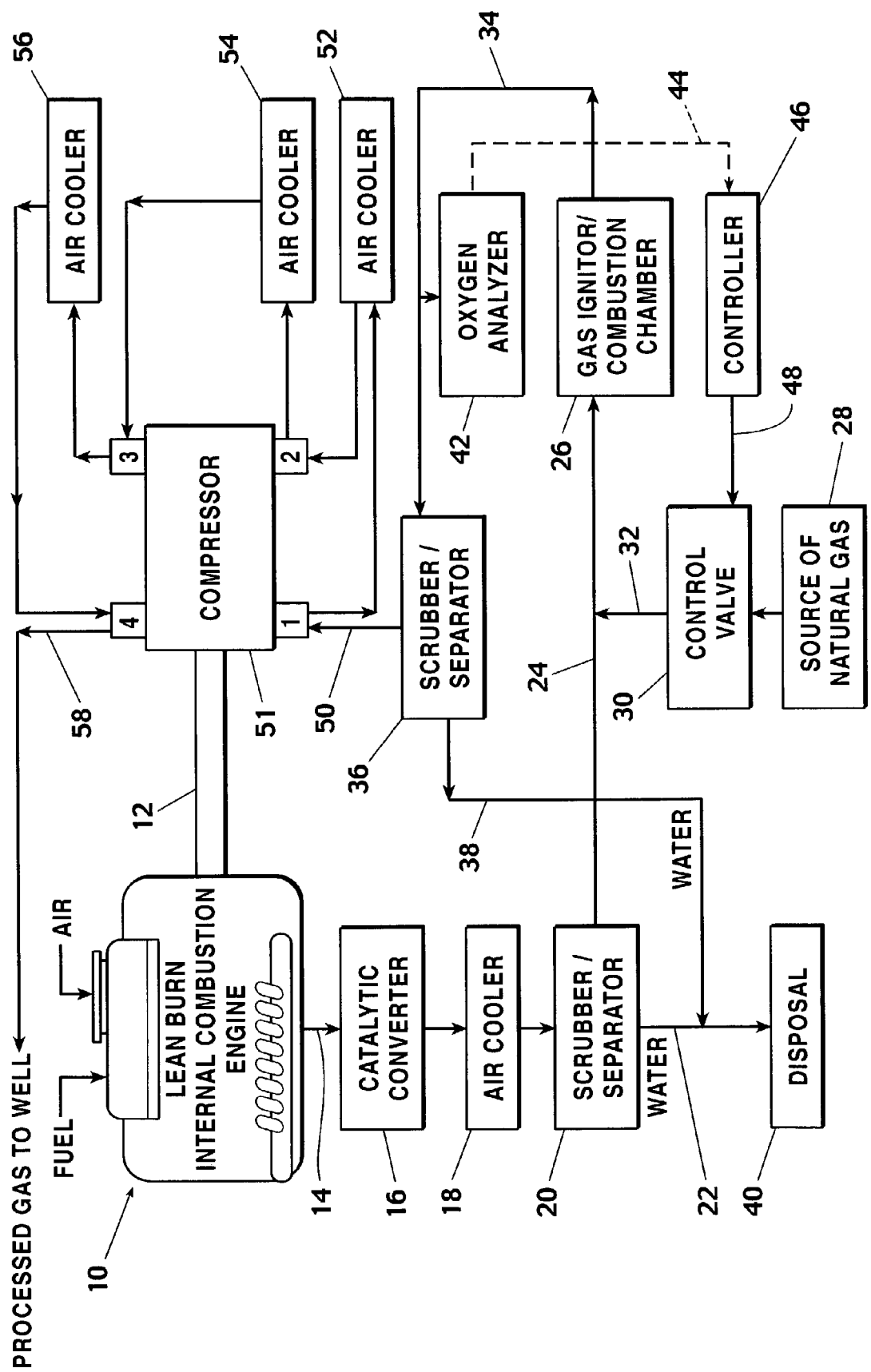

US 7,445,761 B1

METHOD AND SYSTEM FOR PROVIDING COMPRESSED SUBSTANTIALLY OXYGEN-FREE EXHAUST GAS FOR INDUSTRIAL PURPOSES

REFERENCE TO PENDING APPLICATIONS

This is application is not related for purposes of priority to any existing United States or foreign patent application.

REFERENCE TO MICROFICHE APPENDIX

This application is not referenced to any microfiche appendix.

FIELD OF THE INVENTION

The present invention is generally directed toward a method of providing compressed substantially oxygen-free exhaust gas for industrial purposes. More specifically, the present invention is directed toward a system for providing substantially dry oxygen-free exhaust gas that employs a combustor to burn natural gas with the exhaust gas from a lean burn engine to produce substantially oxygen-free exhaust gas.

BACKGROUND OF THE INVENTION

Most oil producing subterranean formations are characterized by pressurized gas. In some parts of the work hydrocarbon bearing formations have pressures sufficient to force liquid hydrocarbons (crude oil) to the earth's surface. In other parts of the world, the gas pressure is not sufficient to force liquid hydrocarbons to the earth's surface. However, in such formations, the presence of gas is nevertheless important since in many formations a gas drive is required to move liquid hydrocarbons from within the formation to the site of a producing well or wells.

As crude oil is extracted from a subterranean reservoir, the reservoir gas pressure decreases. As the gas pressure decreases, crude oil production rates usually fall. For these and other reasons, it has been found desirable in producing many subterranean formations to maintain gas pressure within the formations.

The characteristics of gas injected into a well can be critical. Free oxygen contained in injected gas can cause plugging of formations. Further free oxygen can result in bacteria growth that can plug a producing formation, and corrode tubulars in the producing well.

Ideally, gas injected into a reservoir to augment the production of liquid hydrocarbons should be oxygen-free. Therefore, when treating gas prior to injection, a most important step is to remove substantially all free oxygen.

The present invention provides a process for generating substantially oxygen-free exhaust gas that is particularly useful for injection into hydrocarbon bearing formations.

Examples of the use of exhaust gas from an engine for industrial purposes and examples of the use of exhaust gas to augment liquid hydrocarbon production are found in the following United States patents:

| U.S. PAT. NO. | INVENTOR(S) | TITLE |
| --- | --- | --- |
| 1,868,755 | Mount | Dehydrator |
| 1,945,407 | Adair et al. | Process of Purifying Gases |
| 2,240,550 | Conlon, Jr. | Method of Retuning Gas to Gas-Producing Formations |
| 2,825,408 | Watson | Oil Recovery By Subsurface Thermal Processing |
| 3,004,601 | Bodine | Method and Apparatus for Augmenting Oil Recovery from Wells by Refrigeration |
| 3,100,528 | Plummer, et al. | Method for Using Inert Gas |
| 3,137,344 | Wiemer | Minimizing Loss of Driving Fluids in Secondary Recovery |
| 3,381,523 | Nettles | Method and Apparatus for Supplying Gas Under Pressure |
| 3,653,438 | Wagner | Method of Recovery of Petroleum Deposits |
| 3,908,762 | Redford | Method for Establishing Communication Path in viscous Petroleum-Containing Formations Including Tar Sand Deposits for Use in Oil Recovery Operations |
| 4,324,291 | Wong et al. | Viscous Oil Recovery Method |
| 4,325,432 | Henry | Method of Oil Recovery |
| 4,533,374 | Haag | Method for Reducing Air Pollution |
| 4,546,829 | Martin et al. | Enhanced Oil Recovery Process |
| 4,593,763 | Burke | Carbon Dioxide Well Injection Method |
| 4,891,939 | Brighenti | System for the Cryogenic Processing and Storage of Combustion Products of Heat Engines |
| 5,232,049 | Christiansen, et al. | Sequentially flooding a Subterranean Hydrocarbon-Bearing Formation with a Repeating Cycle of Immiscible Displacement Gases |
| 5,988,280 | Crawford et al. | Use of Engine Heat in Treating a Well Bore |
| 6,039,116 | Stevenson et al. | Oil and Gas Production with Periodic Gas Injection |

BRIEF SUMMARY OF THE INVENTION

This invention is a method and a system for providing substantially oxygen-free exhaust gas useful for industrial purposes and particularly useful for injection into subterranean formations to augment the production of hydrocarbons. The method includes the steps of: 1) extracting exhaust gas from a lean burn natural gas fuel consuming engine; 2) passing the gas from Step 1 through a catalytic converter; 3) cooling the gas from Step 2 to provide a cooled exhaust gas; 4) passing the cooled exhaust gas from Step 3 through a scrubber/separator by which entrained water is extracted to provide dry exhaust gas; 5) conducting the dry exhaust gas into an igniter vessel; (6) flowing natural gas into the igniter vessel in proportion to the level of oxygen in the exhaust gas; (7) combusting the natural gas and oxygen in the exhaust gas; and (8) compressing the substantially oxygen-free exhaust gas for industrial purposes such as for injecting into a hydrocarbon producing formation.

A system for practicing the method of this invention includes a lean burn natural gas fuel consuming engine that produces exhaust gas. A catalytic converter is connected to receive the exhaust gas from the engine. An air cooler is employed by which water vapor is extracted to thereby provide substantially water-free exhaust gas. The oxygen content of the substantially water-free exhaust gas is measured by use of an oxygen analyzer. This measurement is used to regulate the ratio of exhaust gas and natural gas in an igniter where the oxygen is consumed by combustion with the natural gas. The exhaust gas, having minimal oxygen, is then passed through compression and cooling steps to cause any remaining entrained water vapor to condense out. The extracted water vapor is separated and disposed of to provide substantially dry and substantially oxygen-free exhaust gas, which is then compressed so that it can be used industrially, such as for injecting into a producing oil or gas-bearing formation.

A better understanding of the invention will be obtained from the following description and claims taken in conjunction with the attached drawing.

BRIEF DESCRIPTION OF THE DRAWINGS

The drawing is a block diagram that may also be described as a flow diagram that illustrates a method and a system employing a lean burn natural gas combustion engine having a drive shaft connected to a multi-stage compressor. Exhaust gas from the engine is passed through a catalytic converter, cooled and then subjected to compression. Condensed water is extracted to provide a substantially water-free exhaust gas. The exhaust gas is then measured to detect the oxygen content thereof. The exhaust gas is then fed into an igniter that also receives a controlled quantity of natural gas. Combustion within the igniter consumes any and substantially all the oxygen remaining in the exhaust gas to provide substantially oxygen-free exhaust gas for industrial purposes.

DETAILED DESCRIPTION OF THE PREFERRED EMBODIMENTS

Referring to the drawings, and first to FIG. 1, a system that can be used for practicing a method of this invention is shown. The system makes use of the exhaust gas output of a lean burn internal combustion natural gas engine, the engine being indicated by the numeral 10. Such an engine can be the kind utilized in an automobile, a truck or an industrial engine. The size of the engine will be determined by the quantity of gas required. If more gas is required than can be produced by a single engine, then multiple separate engines may be utilized. The engine 10 utilizes natural gas fuel mixed with ambient air that is combusted within the engine to produce energy output in the form of a rotating drive shaft 12. As a consequence of the combustion of the fuel and air within engine 10, exhaust gas is produced at an exhaust 14.

Gas from exhaust 14 is passed through a catalytic converter 16. In the catalytic converter, heated catalysts react with deleterious components of the exhaust gas to substantially neutralize such components to provide an output from the catalytic converter that is more environmentally acceptable.

The exhaust gas having passed through catalytic converter 16 is reduced to a lower temperature in an air cooler 18. From air cooler 18, the exhaust gas is fed into a scrubber/separator 20 in which any entrained water is separated with the water passing out through a discharge line 22 and the exhaust gas passing through a conduit 24. Exhaust gas produced by lean burn engines characteristically has excess oxygen that is not sufficiently removed merely by a sequence of compressing and cooling steps. The essence of this invention is a provision of a method and system whereby exhaust gas from a lean burn engine can be treated in such a way that it is useful for industrial applications including, as a specific but not limiting example, introduction into subterranean oil or gas producing formations to augment production.

For this purpose, exhaust gas appearing in conduit 24 is fed into a gas igniter/combustion chamber which, for brevity, will hereinafter be referred to as a combustion chamber 26. Combustion chamber 26 is a system that mixes any significant oxygen contained within the exhaust gas stream in conduit 24 with a gas fuel so that, by combustion, the oxygen is depleted. For this purpose an igniter that constantly provides a spark or other means for initiating combustion is provided within the combustion chamber 26.

The method of this invention includes the steps of supplying a gaseous fuel into combustion chamber 26 to combine with oxygen contained within the exhaust gas appearing in conduit 24. For this reason, a source of natural gas 28 is utilized. When the system of this invention is employed in an oil field to augment the secondary recovery of petroleum, a source of natural gas is frequently inherently available. In other instances, the source of natural gas may be from a supply line used to supply gas for residential or industrial heating purposes.

The quantity of flow from the source of natural gas 28 is regulated by a control valve 30, the output at 32 which represents a controlled gas source.

Gas from control gas source 32 flows into exhaust conduit 24 to intimately mix with the exhaust gas passing out of scrubber/separator 20 and passing into combustion chamber 26. Thus, the inflow into combustion chamber 26 is exhaust gas having natural gas admixed therewith, the purpose of the natural gas is to combine, by combustion, with oxygen found within the exhaust gas stream appearing at exhaust gas conduit 24 to thereby burn and neutralize the oxygen content.

The output of combustion chamber 26 includes the exhaust gases from conduit 24 plus the results of combustion of natural gas flowing into the combustion chamber from gas source 32. This oxygen-neutralized exhaust gas flows through conduit 34 to a scrubber/separator 36 of the type similar to that identified by the numeral 20. From scrubber/separator entrained water is carried away by water pipe 38 that feeds into a water disposal 40 along with the water from the first scrubber/separator 20 conveyed by water discharge line 22. The purpose of combustion chamber 26 is to mix oxygen occurring in the exhaust gas stream from lean burn engine 10 with gas and the mixture combusted—that is, neutralized, to form substantially nitrogen and carbon dioxide. It is important that the correct quantity of natural gas be supplied from the gas source 28—that is, it is important that control valve 30 be accurately and continuously operated in such a way as to introduce a quantity of natural gas into combustor chamber 26 as is required for complete combustion of oxygen contained in the exhaust gas stream. For this purpose, an oxygen analyzer 42 is connected to sample gas flowing through conduit 34. Oxygen analyzer 42 provides an electrical signal by way of conductor 44 connected to a controller 46 that in turn provides a signal at 48 to regulate control valve 30. More specifically, controller 46 responds to the electrical signal appearing at conductor 44 to provide a control signal at 48 that may be electrical or hydraulic, depending upon the type of control valve 30. When oxygen analyzer 42 detects the presence of oxygen in the exhaust gas flowing through conduit 24, a signal is sent to controller 46 to open control valve 30 to a greater degree, to allow more natural gas to be introduced into combustion chamber 26 to thereby combine with and neutralize the oxygen. On the other hand, if oxygen analyzer 42 detects a reduced amount of oxygen in the exhaust gas appearing in conduit 34, then a reduced quantity of natural gas is supplied to the combustion chamber. In other words, the closed circuit function of oxygen analyzer 42, controller 46, control valve 30 and combustion chamber 26 is to continuously regulate the amount of natural gas supplied to the combustion chamber to substantially neutralize oxygen occurring within the exhaust gas stream at conduit 24 to thereby provide gas that flows through conduit 34 to scrubber/separator 36 that is substantially oxygen-free.

Oxygen neutralized exhaust gas appearing at the outlet conduit 50 from scrubber/separator 36 is fed into the input of a multi-stage compressor 51. In the arrangement as illustrated, compressor 51 has four stages of compression with intermediate coolers 52, 54 and 56. Cooler 52 is between first compressor stage 1 and second compressor stage 2; cooler 54 is between compressor stage 2 and compressor stage 3; and cooler 56 is between compressor stages 3 and 4. The compressed gas at the output 58 of the 4$^{th}$ compression stage is substantially oxygen-free and at an elevated pressure suitable to be used for industrial purposes. As previously stated, an example of an ideal use of the substantially oxygen-free exhaust gas at output 58 is injection into a subterranean hydrocarbon producing formation to maintain the pressure of the formation to thereby augment the production of liquefied petroleum.

The use of a multi-stage compressor 51 with its companion coolers 52, 54 and 56 is by example only. However, for most efficient generation of engine exhaust gas, it is preferable that engine 10 have a load—that is, that it does work. This is achieved by using the available energy from engine 10 to drive compressor 51 to produce the ultimate pressure required at output 58.

The substantially oxygen-free exhaust gas appearing at 58 and as produced by the system and method of this invention as illustrated in the drawing is substantially composed of nitrogen and carbon dioxide. The system confines the carbon dioxide and nitrogen as produced by the engine for industrial use such as injection into a subterranean formation and thereby makes use of the carbon dioxide and nitrogen that would otherwise pass to the atmosphere.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. A method of providing compressed substantially oxygen-free exhaust gas for industrial purposes comprising:
    (1) extracting exhaust gas from a lean burn engine consuming natural gas fuel and air, the extracted exhaust gas having oxygen therein;
    (2) passing said extracted exhaust gas through a cooling step in which the exhaust gas is cooled to cause at least a substantial portion of entrained water vapor therein to condense out leaving substantially water-free exhaust gas;
    (3) introducing said substantially water-free exhaust gas and natural gas into a combustion chamber having means of igniting combustion therein whereby these gases are combusted to produce oxygen-neutralized exhaust gas;
    (4) measuring for oxygen in said oxygen neutralized exhaust gas;
    (5) using the measurement obtained in Step (4) to regulate the ratio of natural gas to substantially water-free exhaust gas into said combustion chamber to ensure that substantially all oxygen in said substantially water-free exhaust gas is depleted as a consequence of combustion in Step (3) providing a substantially oxygen-free exhaust gas; and
    (6) compressing said substantially oxygen-free exhaust gas to provide compressed gas for industrial applications.

2. A method of providing compressed substantially oxygen-free exhaust gas according to claim 1, including, after Step (1) of passing said exhaust gas through a catalytic converter before Step (2).

\* \* \* \* \*